(12) United States Patent
DeGiovine et al.

(10) Patent No.: US 11,832,207 B2
(45) Date of Patent: Nov. 28, 2023

(54) DEVICE LOCATIONING USING A BEACON OF A BATTERY PACK

(71) Applicant: ZEBRA TECHNOLOGIES CORPORATION, Lincolnshire, IL (US)

(72) Inventors: Carl DeGiovine, Sayville, NY (US); Sarika Jain, Buffalo Grove, IL (US); Michael Robustelli, Smithtown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 207 days.

(21) Appl. No.: 17/178,835

(22) Filed: Feb. 18, 2021

(65) Prior Publication Data

US 2022/0264513 A1    Aug. 18, 2022

(51) Int. Cl.
*H04W 64/00*    (2009.01)

(52) U.S. Cl.
CPC .................................. *H04W 64/00* (2013.01)

(58) Field of Classification Search
None
See application file for complete search history.

(56) References Cited

U.S. PATENT DOCUMENTS

| | | | |
|---|---|---|---|
| 9,368,872 | B2 | 6/2016 | Garman et al. |
| 2005/0001767 | A1 | 1/2005 | Wulff et al. |
| 2012/0127902 | A1 | 5/2012 | Muqattash |
| 2013/0093567 | A1 | 4/2013 | Garman et al. |
| 2015/0098304 | A1 | 4/2015 | Harvey |
| 2016/0165570 | A1 | 6/2016 | Kim et al. |
| 2017/0221341 | A1 | 8/2017 | Pai |
| 2017/0289760 | A1* | 10/2017 | Sainfort ................ H04W 4/023 |
| 2017/0317702 | A1 | 11/2017 | O'Hagan et al. |
| 2018/0101208 | A1 | 4/2018 | Kamijima |
| 2018/0206177 | A1 | 7/2018 | Daoura et al. |
| 2020/0272221 | A1 | 8/2020 | Foster |

OTHER PUBLICATIONS

International Search Report and Written Opinion for International Application No. PCT/US2022/011473 dated Apr. 7, 2022.
International Search Report and Written Opinion for International Application No. PCT/US2021/056638 dated Nov. 26, 2021.
Novelty Search Report for Belgian Patent Application No. 2022/5111 dated Feb. 7, 2023.
Notification of the Preliminary Search Report for French Application No. 2201423 dated Feb. 7, 2023.
Novelty Search Report for Belgian Patent Application No. 2021/5865 dated Jul. 15, 2022.

* cited by examiner

*Primary Examiner* — Suhail Khan (57) ABSTRACT

Device locationing using a beacon of a battery pack is described herein. A battery pack may determine that a user device is connected to the battery. The battery pack may determine, based on a power output of the battery, that the user device is inactive. The battery pack may cause, based on determining that the user device is inactive, the beacon to emit a beaconing signal that is associated with locating the user device and/or the battery pack.

7 Claims, 7 Drawing Sheets

DEVICE LOCATIONING USING A BEACON OF A BATTERY PACK

BACKGROUND

Short range wireless communication enables wireless communication over relatively close distances (e.g., within 30 meters). For example, BLUETOOTH® is a wireless technology standard for exchanging data over close distances using short-wavelength ultra-high frequency (UHF) radio waves from 2.4 gigahertz (GHz) to 2.485 GHz. BLUETOOTH® Low Energy (BLE) is a form of BLUETOOTH® communication that allows for communication with devices running on low power. Such devices may include beacons that are wireless communication devices that may use low-energy communication technology for locationing, proximity marketing, or other purposes.

DETAILED DESCRIPTION

The following detailed description of example implementations refers to the accompanying drawings. The same reference numbers in different drawings may identify the same or similar elements.

In some cases, a user device may utilize a communication component (e.g., a short range wireless communication component) of the user device to permit another device, such as a device locator, to identify and/or locate the user device (e.g., in case the user device is lost). For example, when locationing is activated on the user device, the communication component may emit (e.g., broadcast) a beaconing signal that includes an identifier of the user device. The communication component may emit the beaconing signal according to a schedule and/or continuously. Accordingly, once a device locator comes within communication range of the user device, the device locator may receive the beaconing signal. Based on receiving the beaconing signal (e.g., signal strength, frequency of receiving the signal, and/or the like), the device locator may indicate (e.g., via a user device) that the device locator (or a user of the device locator) is within range of the user device. However, once a remaining power level of a battery of the user device drops below a minimum power threshold required to power the communication component of the user device, the user device is unable to use the communication component to emit the beaconing signal. Accordingly, there is a need for a system that enables locationing of a user device under relatively low power conditions (e.g., when a remaining power level is below a threshold required to power a communication component of the user device).

Some implementations described herein provide a system that permits detection of a user device under low power conditions and/or that extends a duration of time for locating a user device when a power level of a battery falls below a threshold for powering a communication component of the battery. The system may include a battery pack for the user device that includes a beacon that is separate from the user device and/or the communication component of the user device. As described herein, the battery pack may detect the low power conditions of the battery and/or inactivity of the user device (e.g., indicating the user device is in a low power mode and/or shut down) and cause the beacon to emit a beaconing signal to facilitate locating the user device (e.g., because the user device is connected to the battery pack). Accordingly, because of the reduced power requirements of the beacon and/or controller of the battery pack described herein, the battery pack may more efficiently utilize power of a battery of the battery pack to emit beaconing signals, thereby extending a duration in which the beaconing signals can be used to locate a user device (and/or the battery pack).

In some implementations, the battery pack has a modular assembly (or arrangement). For example, the battery pack may include a housing that holds one or more components of the beacon and a battery compartment that stores a battery of the battery pack. Accordingly, such a modular assembly facilitates replacement of the battery (e.g., a battery at the end of a lifecycle) within a housing of the battery pack without removing the one or more components of the beacon, thereby permitting interoperability between parts while maintaining durability of the beacon and protection of the battery.

According to some implementations, as described herein, a method for locating a device includes determining, by a controller of a battery pack, that a user device is connected to a battery of the battery pack; determining, by the controller and based on a power output of the battery satisfying a threshold, that the user device is inactive; and causing, by the controller and based on determining that the user device is inactive and connected to the battery pack, a beacon of the battery pack to emit a beaconing signal.

According to some implementations, as described herein, a device includes a battery; a beacon; a memory; and a processor, communicatively coupled to the memory, configured to determine that a user device is connected to the battery; determine, based on a power output of the battery, that the user device is inactive; and cause, based on determining that the user device is inactive, the beacon to emit a beaconing signal that is associated with locating the device.

According to some implementations, as described herein, a battery pack may include a housing; a beacon that is within the housing; a battery that is within the housing; and a controller, mounted to a printed circuit board within the housing, that is configured to determine a connection status associated with the battery pack and a user device; and control, based on the connection status, the beacon to emit a beacon signal.

Figure 1:
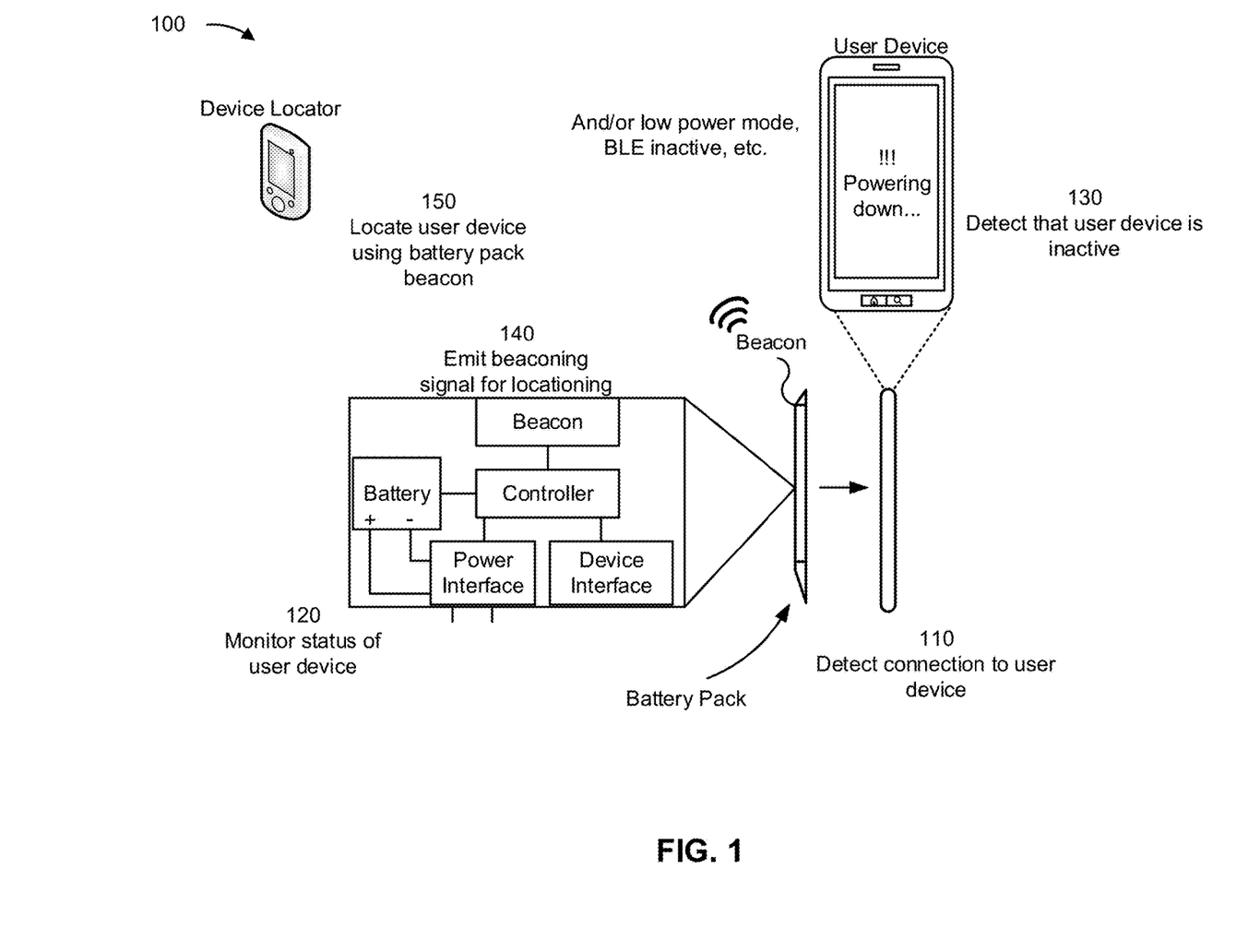
FIG. 1 is a diagram of an example implementation associated with device locationing using a beacon of a battery pack, as described herein.

FIG. 1 is a diagram of an example implementation 100 associated with device locationing using a beacon of a battery pack. As shown in FIG. 1, example implementation 100 includes a user device, a battery pack, and a device locator. The battery pack of example implementation 100 includes a controller, a beacon (e.g., a BLUETOOTH® low energy beacon), a battery, a power interface, and a device interface. These devices are described in more detail below in connection with FIG. 5 and FIG. 6.

As shown in FIG. 1, and by reference number 110, the battery pack detects a connection to the user device. For example, the controller of the battery pack may monitor the power interface (e.g., to detect a power output that is indicative of being connected to a user device) and/or the device interface to determine a connection status associated with the user device (e.g., to detect communication between the battery pack and/or the user device). The battery pack, when connected to the user device, enables the battery to supply power to the user device. Accordingly, when a connection to the user device is detected, the controller may correspondingly detect and/or determine that the user device is connected to the battery (e.g., a power input of the controller is communicatively coupled to the power interface of the battery) and/or that the battery is powering or configured to supply power to the user device.

The power interface may include one or more terminals to connect (e.g., be physically attached) to a load (e.g., the user device) and may be communicatively coupled to the controller via a communication bus (e.g., a serial bus, such as a bus that uses an integrate-integrated circuit (I2C) protocol) of the battery pack. Accordingly, the controller may receive the measurements of the power output and compare the measurements to a load threshold (or range) that is indicative of the power terminals being connected to a load. Based on a measurement of the power output satisfying the load threshold, the controller may detect that the battery pack is connected to the user device.

The device interface may include a connection to a communication bus of the user device. Accordingly, the controller may detect an active bus connection based on the device interface being physically in contact with the communication bus and/or based on a bus signal being transmitted (to the user device) or received (from the user device) over the communication bus. The bus signal may correspond to one or more communications to facilitate an exchange of information and/or data between the user device and the battery pack.

In some implementations, based on detecting the connection to the user device, the battery pack may request and/or obtain a device identifier from the user device. For example, the device identifier may include a serial number, a name, and/or an address of the device. The battery pack may maintain the device identifier locally (e.g., with in a local memory associated with the controller) to permit the battery pack to broadcast a beaconing signal that includes the device identifier, as described elsewhere herein.

As further shown in FIG. 1, and by reference number 120, the battery pack monitors the status of the user device. For example, the battery pack may monitor the status of the user device based on communications (e.g., bus signals) received via the device interface and/or the power output (from the power interface). In some implementations, the controller may monitor the bus connection for a communication that indicates whether the user device is active or inactive. If the controller detects that a bus signal has not been received for a threshold period of time (e.g., a 10 seconds, one minute, ten minutes, and so on), the controller may determine that the user device is inactive.

In some implementations, the battery pack may infer the status of the user device from the power output and/or a remaining power level of the battery. For example, if the power output is below an inactivity threshold, the controller may determine that the user device is inactive. Additionally, or alternatively, if the remaining power of the battery is below a minimum power threshold for powering the user device in an active mode, the controller may determine that the user device is inactive.

In some implementations, the user device may communicate the status of the user device via the device interface. For example, the user device may indicate, to the controller and via the device interface, that the user device is inactive (or entering an inactive mode, such as a low-power mode or non-communication mode). In some implementations, the user device may communicate a status of a communication component of the user device. For example, the user device may indicate whether one or more communication components (e.g., a BLUETOOTH® low energy communication component, a WiFi communication component, and/or the like).

As further shown in FIG. 1, and by reference number 130, the battery pack detects that the user device is inactive. For example, the battery pack may detect that the user device is in a low-power mode and/or that a communication component of the user device is inactive, as described above.

As further shown in FIG. 1, and by reference number 140, the battery pack emits a beaconing signal for locationing. The beaconing signal may be used for locating the user device and/or the battery pack. For example, the controller may configure the beaconing signal to include an identifier associated with the battery pack (e.g., a battery identifier) and/or an identifier associated with the user device (e.g., a device identifier). The beaconing signal may be a BLUETOOTH® low energy signal.

In some implementations, the battery pack may configure the beaconing signal based on whether the battery pack is connected to the user device or disconnected from the user device. For example, as described herein, if the battery pack is connected to the user device, the battery pack may emit a beaconing signal that includes an identifier of the user device. In such a case, the controller may obtain the device identifier from the local memory and embed the device identifier into the beaconing signal. On the other hand, if the battery pack is disconnected (or becomes disconnected) from the user device, the battery pack may emit a beaconing signal that includes an identifier of the battery pack. Additionally, or alternatively, if the battery pack is not connected to a user device, the controller may cause the beacon to emit a beaconing signal that corresponds to a default beaconing signal of the battery pack.

In some implementations, the controller may cause the beacon to emit the beaconing signal based on detecting that the user device is inactive. On the other hand, if the user device determines that the user device is active, the controller may disable the beacon and/or prevent the beacon from emitting a beaconing signal. Accordingly, the controller may prevent the battery pack from emitting a beaconing signal that may interfere with a signal of a communication component (e.g., a short range wireless communication component) of the user device when the user device is active.

In some implementations, the controller may configure a schedule for the beacon to emit the beaconing signal. For example, the schedule may indicate a frequency of transmissions of the beaconing signal during a given time period. The frequency may be based on a remaining power level of the battery. For example, if the remaining power level is relatively low, the controller may cause the beacon to emit the beaconing signal relatively less frequently (e.g., to conserve power). On the other hand, if the remaining power level is relatively high, the controller may cause the beacon to emit the beaconing signal relatively more frequently (e.g., to increase the likelihood that the beaconing signal is received by the device locator while the device locator is within communication range of the battery pack).

As further shown in FIG. 1, and by reference number 150, the device locator locates the user device using the battery pack beacon. For example, the device locator may analyze the beaconing signal(s) emitted by the beacon of the battery pack to determine the location of the battery pack (and the user device if the battery pack is connected to the user device).

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
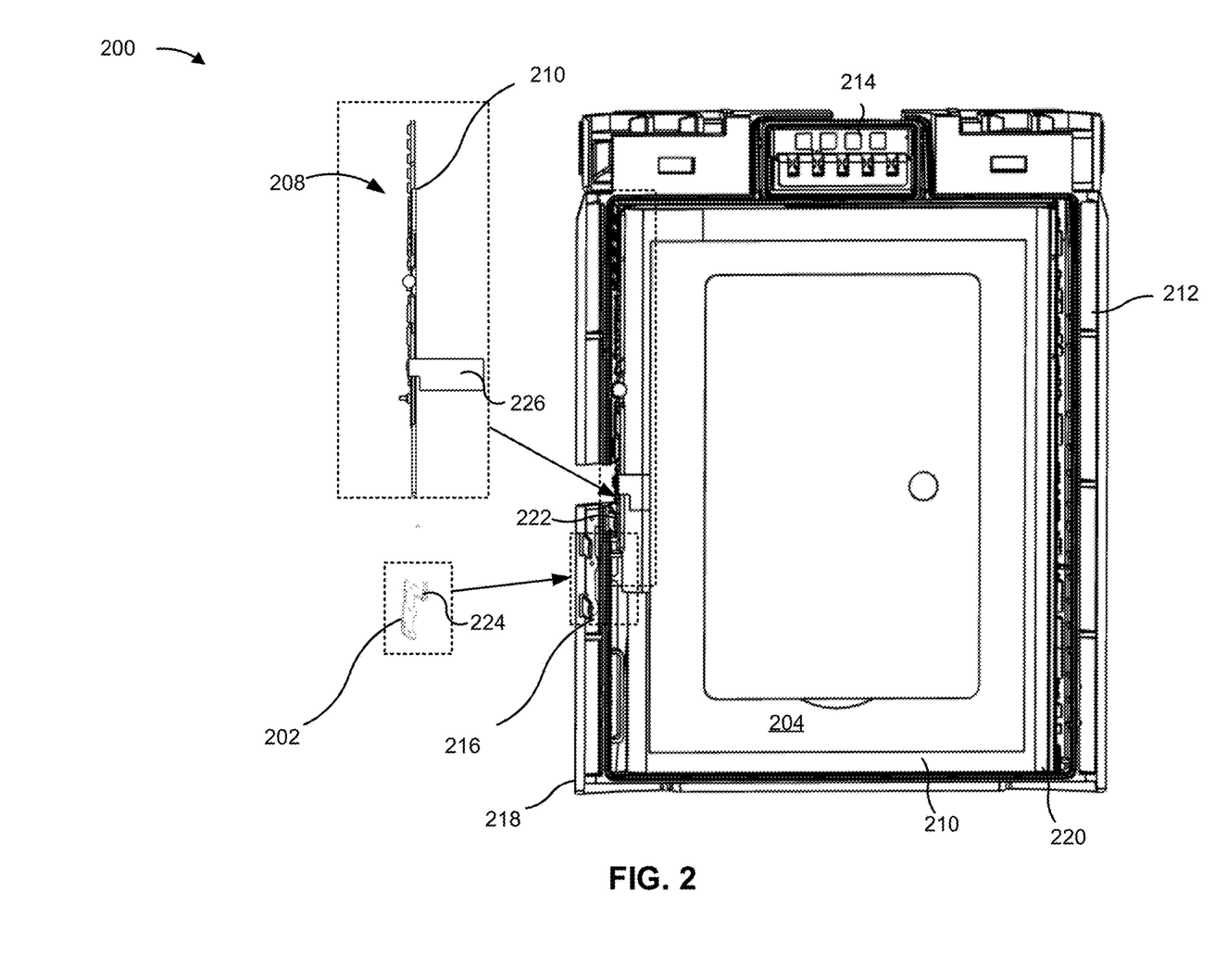
FIG. 2 is a diagram of an example implementation of a battery pack described herein.

FIG. 2 is a diagram of an example implementation of a battery pack 200 described herein. As shown in FIG. 2, the battery pack 200 includes a beacon antenna 202, a battery 204, a controller 208, a printed circuit board (PCB) 210, housing 212, and a power interface 214.

The beacon antenna 202 is an antenna of a beacon described elsewhere herein. The beacon antenna 202 is disposed (e.g., positioned and/or configured) within the housing 212. More specifically, the beacon is disposed within an edge compartment 216 of the housing 212 that is disposed between an antenna-side edge 218 of the housing 212 and a battery compartment 220 of the housing 212. As shown, the battery 204 is disposed within the battery compartment 220.

The edge compartment 216 may be configured to secure the beacon antenna 202 in place (once installed) to protect the beacon antenna 202 while permitting the beacon antenna 202 transmit beaconing signals with relatively low interference from other components of the battery pack (e.g., the battery 204, the controller 208, and/or certain components of the PCB 210).

The controller 208, as shown, is represented as a plurality of components (e.g., a processor, a memory, and/or other components) mounted to the PCB 210. The PCB 210 may include circuitry that permits the controller 208 to perform one or more functions described herein. The circuitry of the PCB 210 may include a ground that is connected to a ground terminal of the battery 204 (e.g., a chassis of the battery 204 and/or a chassis of the battery pack 200). The PCB 210 may be mounted to the battery 204 (e.g., to the chassis of the battery 204). Correspondingly, the controller 208, the PCB 210, and the battery 204 may be positioned within the battery compartment 220 of the housing 212.

The edge compartment 216 may be adjacent the battery compartment 220. Accordingly, when positioned within the edge compartment 216, the beacon antenna 202 may be connected to (e.g., physically attached to or physically in contact with) the controller 208 via a beacon terminal 222 of the PCB 210. The beacon terminal 222 may be associated with one or more components of the beacon that are connected to the circuitry of the PCB 210. The beacon antenna 202 may connect to the beacon terminal 222 via a beacon connector 224. The beacon connector 224 and/or the beacon terminal 222 may come in contact with one another using any suitable technique to facilitate transmission of a beaconing signal via the beacon antenna 202, as described herein.

The PCB 210 may include a ground plane 226. The ground plane 226 may correspond to a ground plane of the beacon associated with the beacon antenna 202 and the beacon terminal 222. As shown, the ground plane 226 may be positioned within a threshold distance of the beacon antenna 202. The threshold distance and/or one or more dimensions of the ground plane 226 may be based on a wavelength (e.g., a half-wavelength, a quarter wavelength, and/or the like) of a beaconing signal of the beacon. The ground plane 226 may connected to the ground terminal of the battery 204 and/or the ground of the PCB 210, and/or a ground terminal of the power interface 214.

Figure 3:
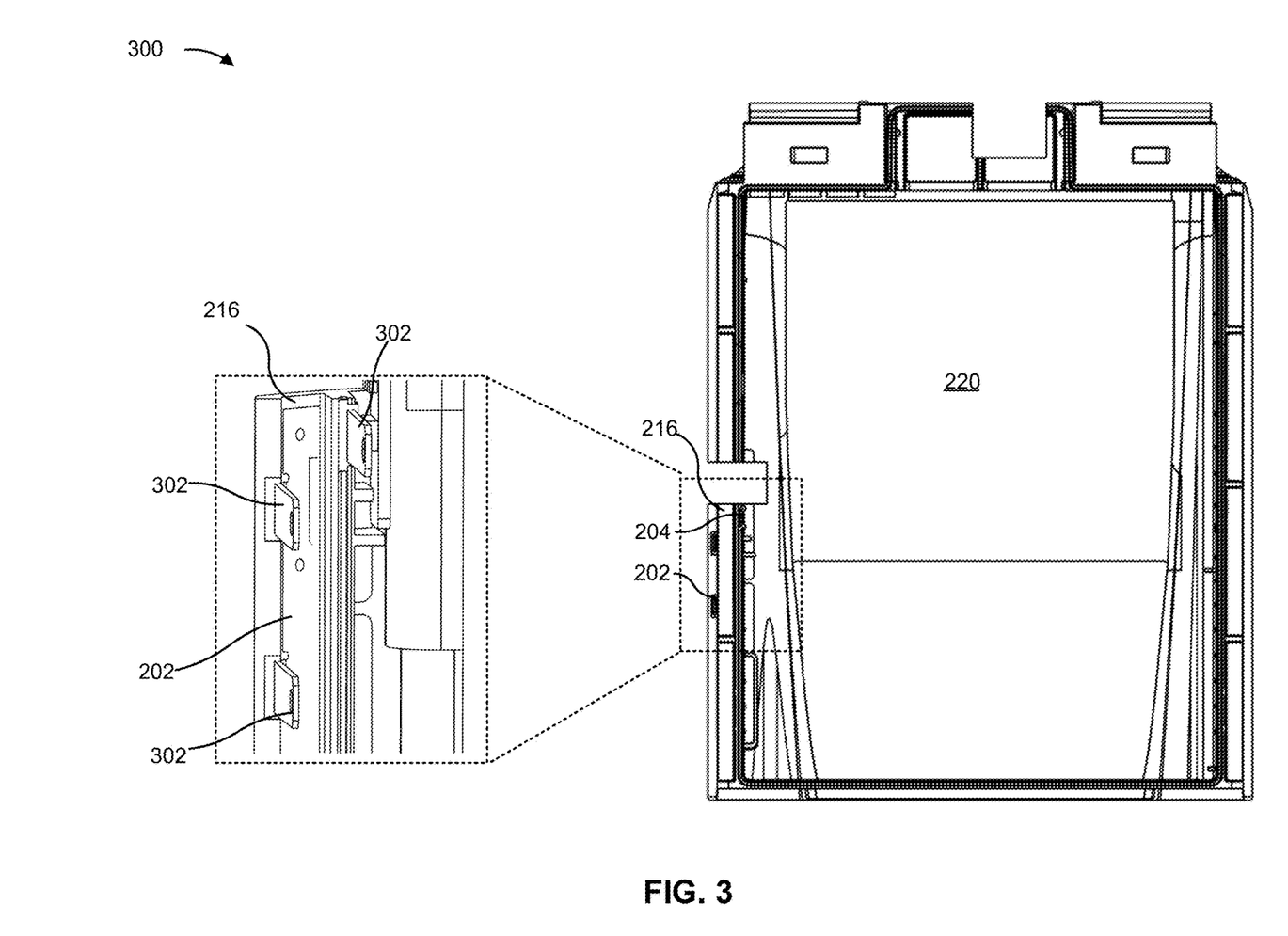
FIG. 3 is a diagram of an example implementation of an assembly of a battery pack described herein.

FIG. 3 is a diagram of an example implementation of an assembly 300 of a battery pack described herein. In FIG. 3, the assembly 300 is formed from the beacon antenna 202 being insert molded within the edge compartment 216 of the housing 212. For example, the housing 212 may be formed during a molding process, using the mold that forms the shape of the housing. Prior to forming the housing 212, the beacon antenna 202 may be placed within the mold using antenna tabs 302.

The antenna tabs 302 (which may be formed from a same material as the beacon antenna 202) may be used to hold the beacon antenna 202 in place as liquified material (e.g., liquified plastic) fills the mold to form the housing 212. Once the liquified material hardens (or cures), the beacon antenna 202 is secured within the edge compartment. Prior to use (e.g., prior to the battery pack being connected to a user device as described herein), the antenna tabs may be removed and/or detached from the beacon antenna 202. In this way, the beacon antenna 202 may be insert molded within the housing 212.

Figure 4:
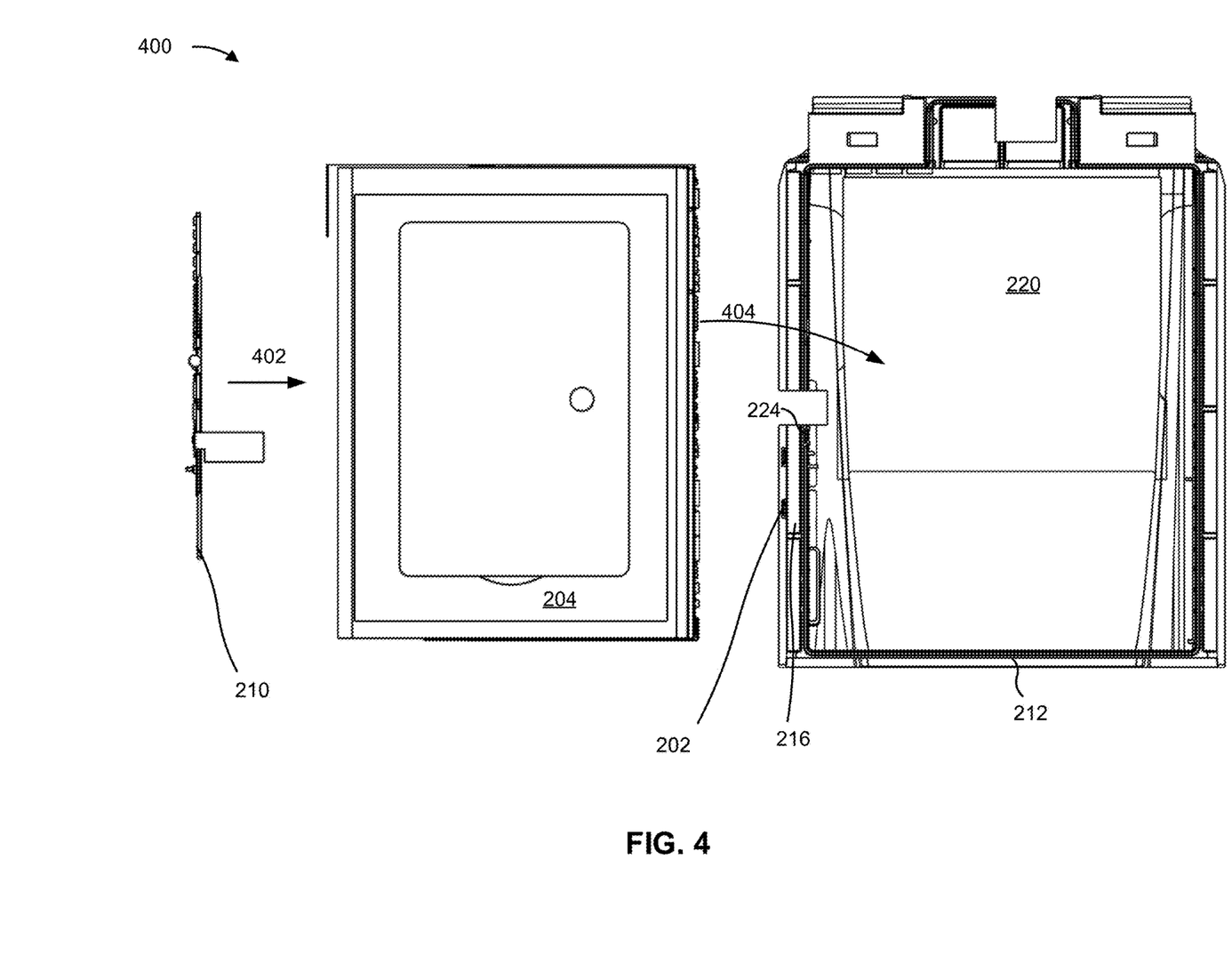
FIG. 4 is a diagram of another example implementation of an assembly of a battery pack described herein.

FIG. 4 is a diagram of another example implementation of an assembly 400 of a battery pack described herein. In FIG. 4, the assembly 400 includes the beacon antenna 202 being insert molded within the edge compartment 216 of the housing 212. As shown by reference number 402, the PCB 210 may be mounted to the battery 204. As shown by reference number 404, the combination of the battery 204 and the PCB 210 may be fit within the battery compartment 220 to form the battery pack (e.g., the battery pack 200) and/or removable from the battery compartment 220 (e.g., to be replaced by another combination that includes a replacement PCB and/or a replacement battery).

In some implementations, the combination of the battery 204 and the PCB 210 may be configured to be press fit within the battery compartment 220. In such a case, the beacon connector 224 (and/or the beacon terminal) may be a spring connector. As a spring connector, the beacon connector 224 may facilitate the combination of the battery 204 and the PCB 210 being press fit into the battery compartment 220 (e.g., by applying pressure via a spring while the battery 204 and/or PCB 210 are being installed within the battery compartment). Further, in such a case, the beacon connector 224 may be configured to provide a flexible connection (e.g., by maintaining pressure via the spring when the battery 204 is installed within the battery compartment 220) between the beacon connector 224 and/or the beacon terminal 222 and may permit the beacon connector 224 to be disconnected (e.g., by applied pressure on the spring) from the beacon terminal 222 when the battery 204 is removed from the battery compartment 220.

Figure 5:
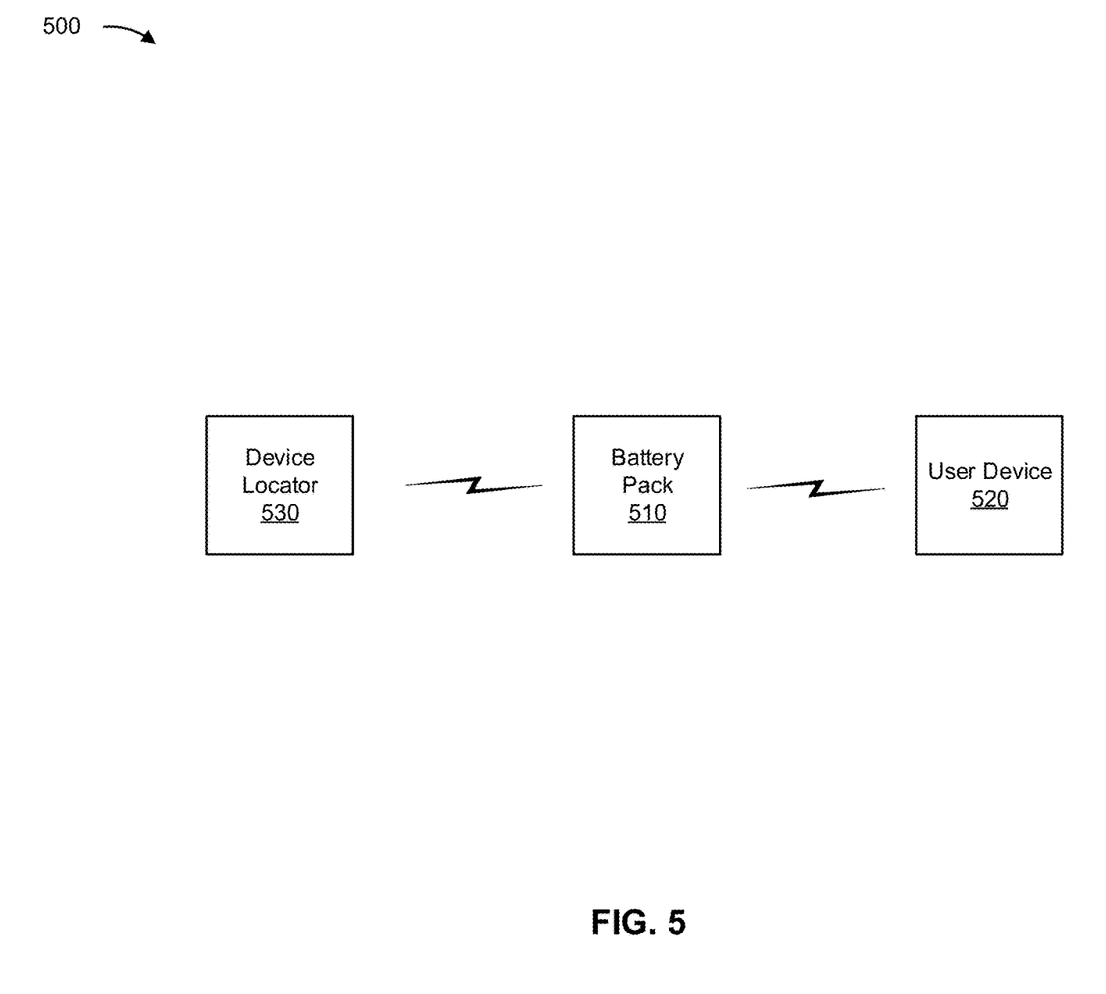
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a battery pack 510, a user device 520, and a device locator 530. Devices of environment 500 may interconnect via wired connections, wireless connections, or a combination of wired and wireless connections.

The battery pack 510 includes one or more devices capable of receiving, generating, storing, processing, and/or providing information associated with indicating a location of a device using a beacon, as described elsewhere herein. The battery pack 510 may include a communication device (e.g., a beacon), a computing device, and/or a power source (e.g., a battery). For example, the battery pack 510 may be configured to power a wireless communication device, a mobile phone, a user equipment, a laptop computer, a tablet computer, a gaming console, a wearable communication device (e.g., a smart wristwatch, a pair of smart eyeglasses, a head mounted display, or a virtual reality headset), or a similar type of device.

The user device 520 includes one or more devices capable of receiving, generating, storing, processing, and/or providing information associated with being located in connection with a beacon of the battery pack 510, as described elsewhere herein. The user device 520 may include a communication device and/or a computing device. For example, the user device 520 may include a wireless communication device, a mobile phone, a user equipment, a laptop computer, a tablet computer, a gaming console, a wearable communication device (e.g., a smart wristwatch, a pair of smart eyeglasses, a head mounted display, or a virtual reality headset), or a similar type of device.

The user device 520 includes one or more devices capable of receiving, generating, storing, processing, and/or providing information associated with being located in connection with a beacon of a battery pack, as described elsewhere herein. The user device 520 may include a communication device and/or a computing device. For example, the user device 520 may include a wireless communication device, a mobile phone, a user equipment, a laptop computer, a tablet computer, a gaming console, a wearable communication device (e.g., a smart wristwatch, a pair of smart eyeglasses, a head mounted display, or a virtual reality headset), or a similar type of device.

The device locator 530 includes one or more devices capable of receiving, generating, storing, processing, and/or providing information associated with locating a device (e.g., the battery pack 510 and/or the user device 520) using a beacon of the battery pack 510, as described elsewhere herein. The device locator 530 may include a communication device and/or a computing device. For example, the device locator 530 may include a wireless communication device, a mobile phone, a user equipment, a laptop computer, a tablet computer, a wearable communication device (e.g., a smart wristwatch, a pair of smart eyeglasses, a head mounted display, or a virtual reality headset), or a similar type of device.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
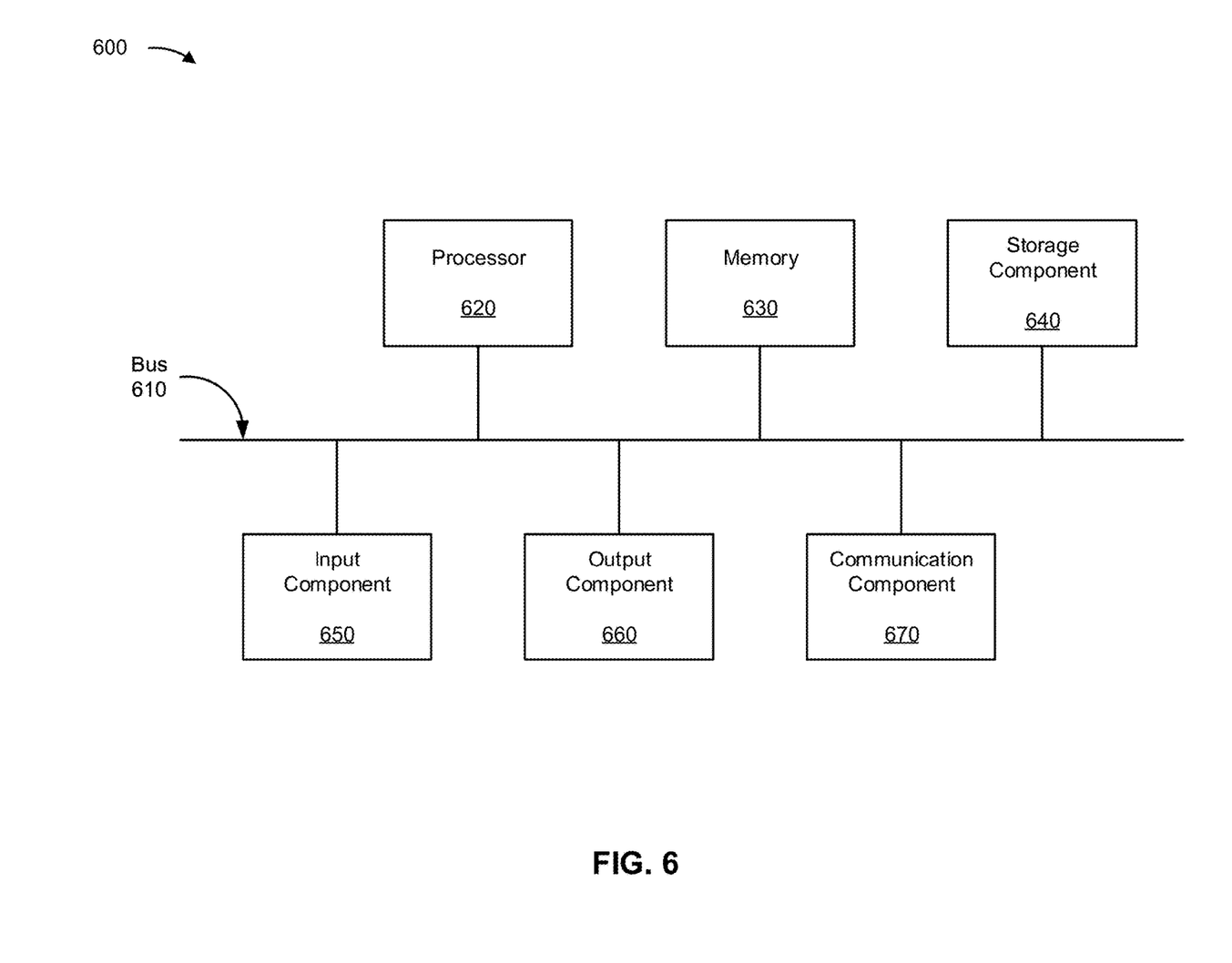
FIG. 6 is a diagram of example components of one or more devices of FIG. 5.

FIG. 6 is a diagram of example components of a device 600, which may correspond to the battery pack 510, the user device 520, and/or the device locator 530. In some implementations, the battery pack 510, the user device 520, and/or the device locator 530 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
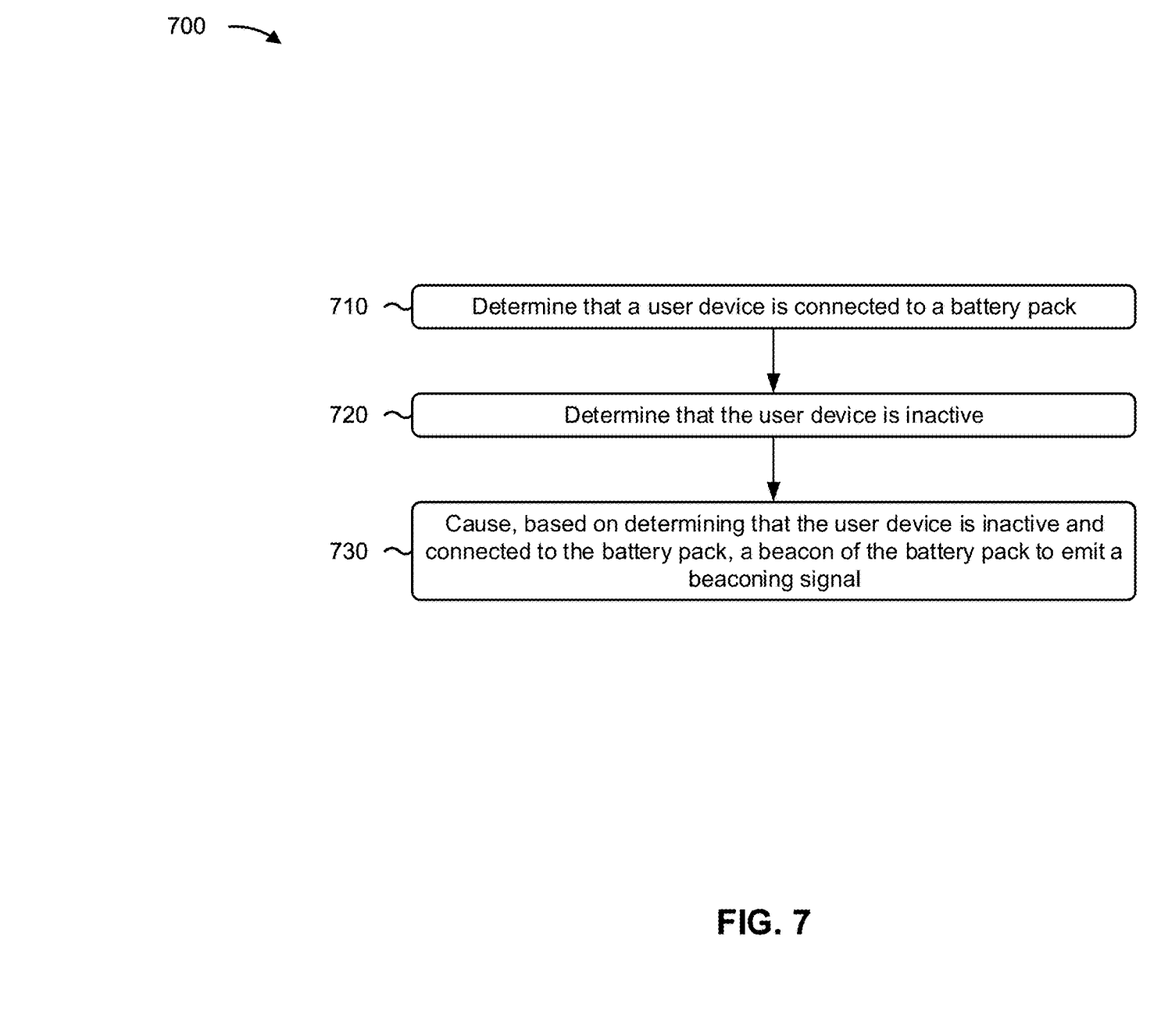
FIG. 7 is a flowchart of an example process relating to associated with device locationing using a beacon of a battery pack.

FIG. 7 is a flowchart of an example process 700 associated with device locationing using a beacon of a battery pack. In some implementations, one or more process blocks of FIG. 7 may be performed by a controller of a battery pack (e.g., the battery pack 510). In some implementations, one or more process blocks of FIG. 7 may be performed by another device or a group of devices separate from or including the controller or the battery pack, such as a user device (e.g., the user device 520) and/or a device locator (e.g., the device locator 530). Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include determining that a user device is connected to a battery pack (block 710). For example, the controller may determine that a user device is connected to a battery of the battery pack, as described above.

As further shown in FIG. 7, process 700 may include determining that the user device is inactive (block 720). For example, the controller may determine that the user device is inactive, as described above. In some implementations, the user device is determined to be connected to the battery based on a power output of a battery of the battery pack, and a bus signal from the user device that is received via a bus connection to the user device.

As further shown in FIG. 7, process 700 may include causing, based on determining that the user device is inactive and connected to the battery pack, a beacon of the battery pack to emit a beaconing signal (block 730). For example, the controller may cause, based on determining that the user device is inactive and connected to the battery pack, a beacon of the battery pack to emit a beaconing signal, as described above. In some implementations, the beacon is a BLUETOOTH® low energy beacon and the beaconing signal is a BLUETOOTH® low energy signal.

In some implementations, a device identifier is obtained from the user device based on determining that the user device is connected to the battery pack, wherein the device identifier is included in the beaconing signal. In some implementations, the controller may maintain the device identifier in a local memory of the battery pack. The controller, causing the beacon to emit the beaconing signal, may obtain the device identifier from the local memory, embed the device identifier within the beaconing signal, and provide the beaconing signal to the beacon.

In some implementations, the beaconing signal is a first beaconing signal, and the controller may determine that the battery is disconnected from the user device, and cause, based on determining that the battery being disconnected, the beacon to emit a second beacon signal that includes a battery identifier of the battery.

In some implementations, the controller, when causing the beacon to emit the beaconing signal, may determine a power level of the battery, determine, based on the power level of the battery, a schedule associated with emitting the beaconing signal, and cause the beacon to emit the beaconing signal according to the schedule. In some implementations, the controller may determine, based on the power output of the battery, that the user device is active and cause, based on determining that the user device is active, the beacon to stop emitting the beaconing signal.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for locating a device, comprising:
   determining, by a controller of a battery pack, that a user device is connected to the battery pack;
   determining, by the controller, that the user device is inactive; and
   causing, by the controller and based on determining that the user device is inactive and connected to the battery pack, a beacon of the battery pack to emit a beaconing signal.

2. The method of claim 1, wherein a device identifier is obtained from the user device based on determining that the user device is connected to the battery pack,
   wherein the device identifier is included in the beaconing signal.

3. The method of claim 2, further comprising:
   maintaining the device identifier in a local memory of the battery pack,
   wherein causing the beacon to emit the beaconing signal comprises:
      obtaining the device identifier from the local memory;
      embedding the device identifier within the beaconing signal; and
      providing the beaconing signal to the beacon.

4. The method of claim 1, wherein the user device is determined to be connected to the battery pack based on at least one of:
   a power output of a battery of the battery pack, and
   a bus signal from the user device that is received via a bus connection to the user device.

5. The method of claim 1, wherein the beaconing signal is a first beaconing signal, further comprising:
   determining that the battery is disconnected from the user device; and
   causing, based on determining that the battery being disconnected, the beacon to emit a second beacon signal that includes a battery identifier of the battery.

6. The method of claim 1, wherein causing the beacon to emit the beaconing signal comprises:
   determining a power level of the battery;
   determining, based on the power level of the battery, a schedule associated with emitting the beaconing signal; and
   causing the beacon to emit the beaconing signal according to the schedule.

7. The method of claim 1, wherein the beacon is a BLUETOOTH® low energy beacon and the beaconing signal is a BLUETOOTH® low energy signal.

* * * * *